US012614060B2

(12) United States Patent
Hwang

(10) Patent No.: US 12,614,060 B2
(45) Date of Patent: Apr. 28, 2026

(54) METHOD AND SYSTEM FOR EVALUATING EVALUATION TARGET BY VARIOUS CHARACTERISTICS USING MIXTURE OF EXPERT

(71) Applicant: Piamond Corp., Busan (KR)

(72) Inventor: Doo Geon Hwang, Busan (KR)

(73) Assignee: Piamond Corp., Busan (KR)

( * ) Notice: Subject to any disclaimer, the term of this patent is extended or adjusted under 35 U.S.C. 154(b) by 0 days.

(21) Appl. No.: 18/999,411

(22) Filed: Dec. 23, 2024

(65) Prior Publication Data

US 2026/0030483 A1 Jan. 29, 2026

(30) Foreign Application Priority Data

Jul. 26, 2024 (KR) ........................ 10-2024-0099364
Jul. 26, 2024 (KR) ........................ 10-2024-0099365
Jul. 26, 2024 (KR) ........................ 10-2024-0099366

(51) Int. Cl.
*G06N 3/0455* (2023.01)
*G06N 3/098* (2023.01)

(52) U.S. Cl.
CPC ........... *G06N 3/0455* (2023.01); *G06N 3/098* (2023.01)

(58) Field of Classification Search
CPC .............................. G06N 3/0455; G06N 3/098
See application file for complete search history.

(56) References Cited

U.S. PATENT DOCUMENTS

| | | | |
|---|---|---|---|
| 2024/0386015 A1* | 11/2024 | Crabtree | ............. G06F 16/9024 |
| 2025/0046409 A1* | 2/2025 | Thompson, IV | ...... G16H 70/60 |
| 2025/0217586 A1* | 7/2025 | Sinha | ...................... G06F 40/20 |

FOREIGN PATENT DOCUMENTS

KR 10-2024-0010506 1/2024

* cited by examiner

*Primary Examiner* — Alexey Shmatov
*Assistant Examiner* — Devika S Maharaj
(74) *Attorney, Agent, or Firm* — Christensen O'Connor Johnson Kindness PLLC

(57) ABSTRACT

A method and system for evaluating evaluation target by various characteristics using MOE are disclosed. According to one embodiment, an evaluation system may include Reader Modules for receiving evaluation target data and preprocessing it by characteristics of each of a plurality of artificial intelligence models for evaluation, an Evaluation Controller for controlling input of the preprocessed evaluation target data into the plurality of artificial intelligence models for evaluation, Multi-dimensional Evaluation Models for configuring each of the plurality of artificial intelligence models for evaluation into a plurality of instance models in multi-dimension by characteristics of the evaluation target data, and Federated Evaluation Models for integrating evaluation results for the preprocessed evaluation target data of each of the plurality of artificial intelligence models for evaluation and generating overall evaluation result.

15 Claims, 7 Drawing Sheets

FIG. 5

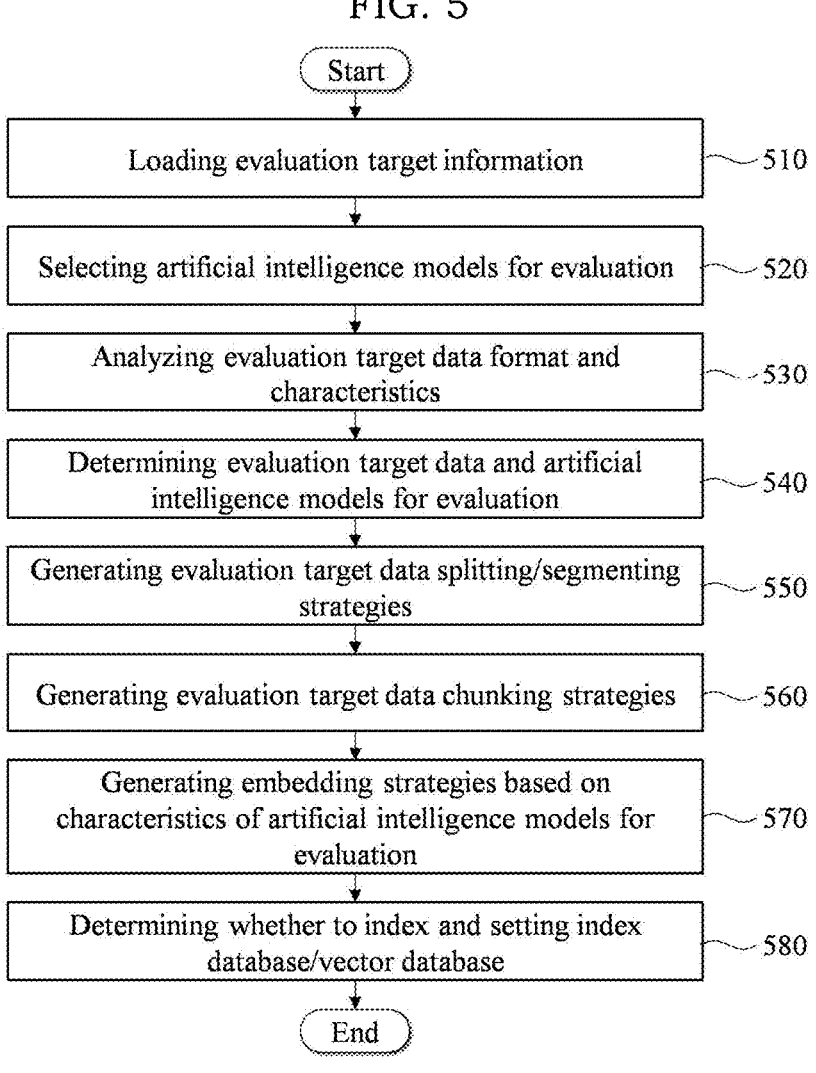

Start

Loading evaluation target information ⟶ 510

Selecting artificial intelligence models for evaluation ⟶ 520

Analyzing evaluation target data format and characteristics ⟶ 530

Determining evaluation target data and artificial intelligence models for evaluation ⟶ 540

Generating evaluation target data splitting/segmenting strategies ⟶ 550

Generating evaluation target data chunking strategies ⟶ 560

Generating embedding strategies based on characteristics of artificial intelligence models for evaluation ⟶ 570

Determining whether to index and setting index database/vector database ⟶ 580

End

Start

Preparing evaluation models — 610

Confirming and certifying evaluation models — 620

Setting prompts for evaluation — 630

Determining response result output system — 640

Connecting input pipelines — 650

Connecting output pipelines — 660

End

FIG. 7

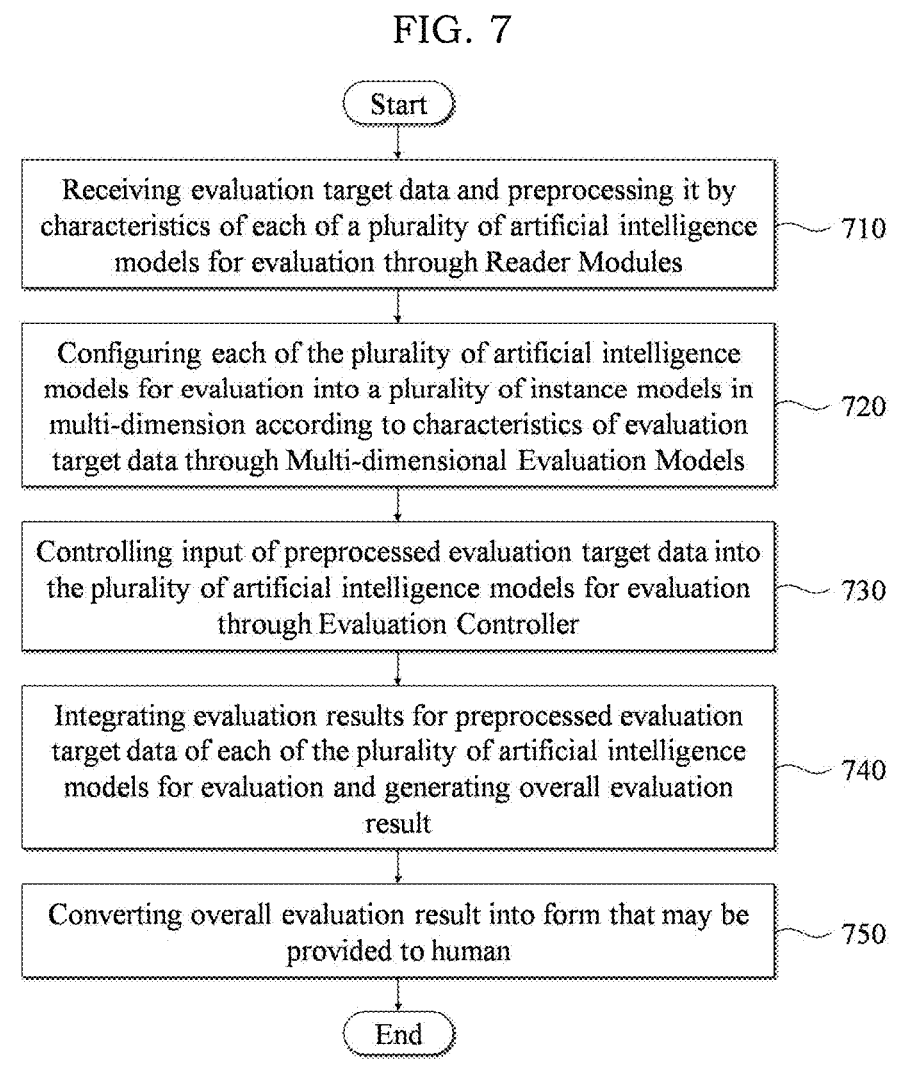

Start

Receiving evaluation target data and preprocessing it by characteristics of each of a plurality of artificial intelligence models for evaluation through Reader Modules — 710

Configuring each of the plurality of artificial intelligence models for evaluation into a plurality of instance models in multi-dimension according to characteristics of evaluation target data through Multi-dimensional Evaluation Models — 720

Controlling input of preprocessed evaluation target data into the plurality of artificial intelligence models for evaluation through Evaluation Controller — 730

Integrating evaluation results for preprocessed evaluation target data of each of the plurality of artificial intelligence models for evaluation and generating overall evaluation result — 740

Converting overall evaluation result into form that may be provided to human — 750

End

METHOD AND SYSTEM FOR EVALUATING EVALUATION TARGET BY VARIOUS CHARACTERISTICS USING MIXTURE OF EXPERT

CROSS-REFERENCES TO RELATED APPLICATIONS

This application claims the benefit of priority under 35 U.S.C. § 119 to Korean Patent Application No. 10-2024-0099364 filed on Jul. 26, 2024, Korean Patent Application No. 10-2024-0099365 filed on Jul. 26, 2024, and Korean Patent Application No. 10-2024-0099366 filed on Jul. 26, 2024, in the Korean Intellectual Property Office (KIPO), the entire contents of which are incorporated herein by reference.

BACKGROUND

1. Field

The following description relates to a method and system for evaluating evaluation target by various characteristics using MOE (Mixture Of Expert).

2. Description of Related Art

In a process for providing services to users, evaluation for data of various characteristics is required. For example, in a service for selling products to users, it is required to evaluate whether description of a specific product includes sufficient information to explain the corresponding product to users. As another example, it is required to evaluate whether contents of user terms and conditions of a specific service are unfair or easy to understand. As another example, it is required to evaluate whether there are any omissions when compared to established policies or laws.

Previously, supervisors (people) had to directly review various data to check whether there were any issues related to service provision. In addition, there are technologies to automatize such data evaluation, but this requires development and application of specific evaluation algorithms for data of specific domains.

PRIOR ART DOCUMENTS

Korean Patent Publication No. 10-2024-0010506

SUMMARY

A method and system for evaluating evaluation target by various characteristics using MOE (Mixture Of Expert) are provided.

An evaluation system comprises Reader Modules for receiving evaluation target data and preprocessing it by characteristics of each of a plurality of artificial intelligence models for evaluation; an Evaluation Controller for controlling input of the preprocessed evaluation target data into the plurality of artificial intelligence models for evaluation; Multi-dimensional Evaluation Models for configuring each of the plurality of artificial intelligence models for evaluation into a plurality of instance models in multi-dimension by characteristics of the evaluation target data; and Federated Evaluation Models for integrating evaluation results for the preprocessed evaluation target data of each of the plurality of artificial intelligence models for evaluation and generating overall evaluation result.

According to an aspect, the Reader Modules may split or segment the evaluation target data by characteristics of each of the plurality of artificial intelligence models for evaluation, chunk the split or segmented evaluation target data, and generate input for each of the plurality of artificial intelligence models for evaluation by embedding the chunked evaluation target data.

According to another aspect, the Reader Modules may index the evaluation target data and store the indexed evaluation target data with index in index database.

According to another aspect, the Evaluation Controller may comprise a Scheduler for scheduling overall evaluation processes of the evaluation target data by using the plurality of artificial intelligence models for evaluation; a Supervisor Agent for continuously reading the preprocessed evaluation target data and querying each of the plurality of artificial intelligence models for evaluation so that each of the plurality of artificial intelligence models for evaluation may evaluate the preprocessed evaluation target data; and a Prompt Controller for generating prompts for evaluation to be input into each of the plurality of artificial intelligence models for evaluation.

According to another aspect, the Evaluation Controller may further comprise a Policy Controller for storing evaluation related policies, and the Prompt Controller generates the prompts for evaluation based on the evaluation related policies.

According to another aspect, characteristics of the evaluation target data may comprise at least one characteristic of ages, nationality, player role, language, culture, inclusion of visual data, gender, and hearing impairment.

According to another aspect, the Multi-dimensional Evaluation Models may generate instance models of the artificial intelligence models for evaluation by each predetermined classification for each of the at least one characteristic.

According to another aspect, each of the plurality of instance models may output scores or review comments as evaluation result for the preprocessed evaluation target data.

According to another aspect, the Federated Evaluation Models may receive the evaluation result of each of the plurality of artificial intelligence models for evaluation as input, conduct additional evaluation, and generate the overall evaluation result.

According to another aspect, the overall evaluation result may comprise scores for the additional evaluation and review comments for the additional evaluation.

According to another aspect, the evaluation system may further comprise a language model for converting the overall evaluation result into a form that may be provided to human.

An evaluation method of an evaluation system may comprise Reader Modules, an Evaluation Controller, Multi-dimensional Evaluation Models, and Federated Evaluation Models, and comprise receiving evaluation target data and preprocessing it by characteristics of each of a plurality of artificial intelligence models for evaluation through the Reader Modules; configuring each of the plurality of artificial intelligence models for evaluation into a plurality of instance models in multi-dimension by characteristics of the evaluation target data through the Multi-dimensional Evaluation Models; controlling input of the preprocessed evaluation target data into the plurality of artificial intelligence models for evaluation through the Evaluation Controller; and integrating evaluation results for the preprocessed evaluation target data of each of the plurality of artificial intelligence models for evaluation and generating overall evaluation result through the Federated Evaluation Models.

According to an aspect, the preprocessing may comprise splitting or segmenting the evaluation target data by characteristics of each of the plurality of artificial intelligence models for evaluation; chunking the split or segmented evaluation target data; generating input for each of the plurality of artificial intelligence models for evaluation by embedding the chunked evaluation target data.

According to another aspect, the preprocessing may comprise indexing the evaluation target data and storing the indexed evaluation target data with index in index database.

According to another aspect, the Evaluation Controller may comprise a Scheduler, a Supervisor Agent, and a Prompt Controller, and the controlling may comprise scheduling overall evaluation processes of the evaluation target data by using the plurality of artificial intelligence models for evaluation through the Scheduler; generating prompts for evaluation to be input into each of the plurality of artificial intelligence models for evaluation through the Prompt Controller; and continuously reading the preprocessed evaluation target data and querying each of the plurality of artificial intelligence models for evaluation so that each of the plurality of artificial intelligence models for evaluation may evaluate the preprocessed evaluation target data through the Supervisor Agent.

According to another aspect, characteristics of the evaluation target data may comprise at least one characteristic of ages, nationality, player role, language, culture, inclusion of visual data, gender, and hearing impairment.

According to another aspect, the configuring may include generating instance models of the artificial intelligence models for evaluation for each predetermined classification for each of the at least one characteristic.

According to another aspect, the generating may receive the evaluation result of each of the plurality of artificial intelligence models for evaluation as input, conduct additional evaluation, and generate the overall evaluation result.

An evaluation process setting method of a computer device comprising at least one processor may comprise selecting artificial intelligence models for evaluation registered in an evaluation system for evaluation of evaluation target data, by the at least one processor; analyzing format and characteristics of the evaluation target data, by the at least one processor; determining artificial intelligence models for evaluation to be used in evaluation of the evaluation target data based on the selected artificial intelligence models for evaluation and the analyzed format and characteristics of the evaluation target data, by the at least one processor; and generating preprocess strategies of the evaluation target data based on characteristics of the determined artificial intelligence models for evaluation and characteristics of the evaluation target data, by the at least one processor.

According to an aspect, the generating preprocess strategies may comprise determining splitting strategies or segmenting strategies for splitting or segmenting the evaluation target data by characteristics of each of the plurality of artificial intelligence models for evaluation; determining chunking strategies for chunking the split or segmented evaluation target data; and determining embedding strategies for generating input for each of the plurality of artificial intelligence models for evaluation by embedding the chunked evaluation target data.

According to another aspect, the determining splitting strategies or segmenting strategies may determine the splitting strategies or segmenting strategies based on length of tokens that may be input into the artificial intelligence models for evaluation.

According to another aspect, the determining embedding strategies may determine embedding strategies for using different forms of embedding models according by embedding characteristics of the artificial intelligence models for evaluation for the same evaluation target data.

According to another aspect, the generating preprocess strategies may comprise determining whether to index the evaluation target data According to another aspect, the determining artificial intelligence models for evaluation to be used may determine a plurality of artificial intelligence models for evaluation for evaluating each of the evaluation target data, and the generating preprocess strategies may generate preprocess strategies for each of the plurality of artificial intelligence models for evaluation.

According to another aspect, the evaluation system may comprise Multi-dimensional Evaluation Models for configuring each of the plurality of artificial intelligence models for evaluation into a plurality of instance models in multi-dimension by characteristics of the evaluation target data, and the generating preprocess strategies may generate preprocess strategies for each of the configured plurality of instance models.

According to another aspect, the analyzing may determine the format of the evaluation target data as at least one of text format, or rich format including tables or images.

According to another aspect, the evaluation process setting method may further comprise analyzing format and characteristics of output data of the determined artificial intelligence models for evaluation, by the at least one processor.

A method for preparing evaluation models of a computer device comprising at least one processor may comprise registering artificial intelligence models for evaluation to be used by characteristics of evaluation target data in an evaluation system, by the at least one processor; confirming at least one of uniqueness and parameter information of the artificial intelligence models for evaluation, by the at least one processor; setting prompts for evaluation to be input into the artificial intelligence models for evaluation, by the at least one processor; determining an output system of output values of the artificial intelligence models for evaluation, by the at least one processor; connecting input pipelines for input of the artificial intelligence models for evaluation, by the at least one processor; and connecting output pipelines for process of output values of the artificial intelligence models for evaluation, by the at least one processor.

According to an aspect, the artificial intelligence models for evaluation may comprise at least one of an evaluation model provided by a third party, an evaluation model used by two or more specific subject for mutual verification, and an evaluation model internally used by the evaluation system.

According to another aspect, the confirming may comprise generating and storing data for certification of the artificial intelligence models for evaluation.

According to another aspect, data for the certification of the artificial intelligence models for evaluation may comprise hash values for the parameter information.

According to another aspect, the setting prompts for evaluation may set the prompts for evaluation based on at least one of information going through a separate evaluation procedure for each specific domain, information specified by law or regulation, company rules, preset regulation for the prompts for evaluation, and the preset prompt According to another aspect, the determining an output system may determine at least one of whether the output values of the artificial intelligence models for evaluation include scores and whether the output values include review comments.

According to another aspect, the connecting input pipelines may connect input pipelines limiting at least one of input speed of the evaluation target data and length of tokens based on at least one of operation characteristics of the artificial intelligence models for evaluation and performance of operation environment to the artificial intelligence models for evaluation.

According to another aspect, the connecting output pipelines may connect the output pipelines to the artificial intelligence models for evaluation according to at least one of whether the output values of the artificial intelligence models for evaluation are reused again as input of the artificial intelligence models for evaluation, whether the output values are used as evaluation index as input of other artificial intelligence models for evaluation, and whether the output values are separately used in the evaluation system.

According to another aspect, the evaluation system may comprise Multi-dimensional Evaluation Models for configuring each of the plurality of artificial intelligence models for evaluation into a plurality of instance models in multi-dimension by characteristics of the evaluation target data.

A computer program stored in a computer-readable recording medium to execute the method on a computer device in conjunction with the computer device is provided.

A computer-readable recording medium storing a computer program to execute the method on a computer device is provided.

A computer device includes at least one processor implemented to execute instructions readable on the computer device, and the computer device, by the at least one processor, selects artificial intelligence models for evaluation registered in an evaluation system for evaluation of evaluation target data, analyzes format and characteristics of the evaluation target data, determines artificial intelligence models for evaluation to be used in evaluation of the evaluation target data based on the selected artificial intelligence models for evaluation and the analyzed format and characteristics of the evaluation target data, and generates preprocess strategies of the evaluation target data based on characteristics of the determined artificial intelligence models for evaluation and characteristics of the evaluation target data.

A computer device includes at least one processor implemented to execute instructions readable on the computer device, and the computer device, by the at least one processor, registers artificial intelligence models for evaluation to be used by characteristics of evaluation target data in an evaluation system, confirms at least one of uniqueness and parameter information of the artificial intelligence models for evaluation, sets prompts for evaluation to be input into the artificial intelligence models for evaluation, determines an output system of output values of the artificial intelligence models for evaluation, connects input pipelines for input of the artificial intelligence models for evaluation, and connects output pipelines for process of output values of the artificial intelligence models for evaluation.

A method and system for evaluating evaluation target by various characteristics using MOE (Mixture Of Expert) may be provided.

A method and system for setting evaluation process using MOE (Mixture Of Expert) may be provided.

A method and system for preparing evaluation model for evaluation process using MOE (Mixture Of Expert) may be provided.

BRIEF DESCRIPTION OF THE DRAWINGS

FIG. 5 is a flowchart illustrating an example of an evaluation process based on artificial intelligence models according to an embodiment;

FIG. 7 is a flowchart illustrating an example of an evaluation method of an evaluation system according to an embodiment.

DETAILED DESCRIPTION

Hereinafter, embodiments will be described with reference to the accompanying drawings.

An evaluation system according to embodiments of the present disclosure may be implemented by at least one computer device. At this time, in a computer device implementing the evaluation system, a computer program according to one embodiment of the present disclosure may be installed and run, and the at least one computer device may perform an evaluation method according to embodiments of the present disclosure according to control of the run computer program. The aforementioned computer program may be stored in a computer-readable recording medium to execute the evaluation method in conjunction with the computer device.

Figure 1:
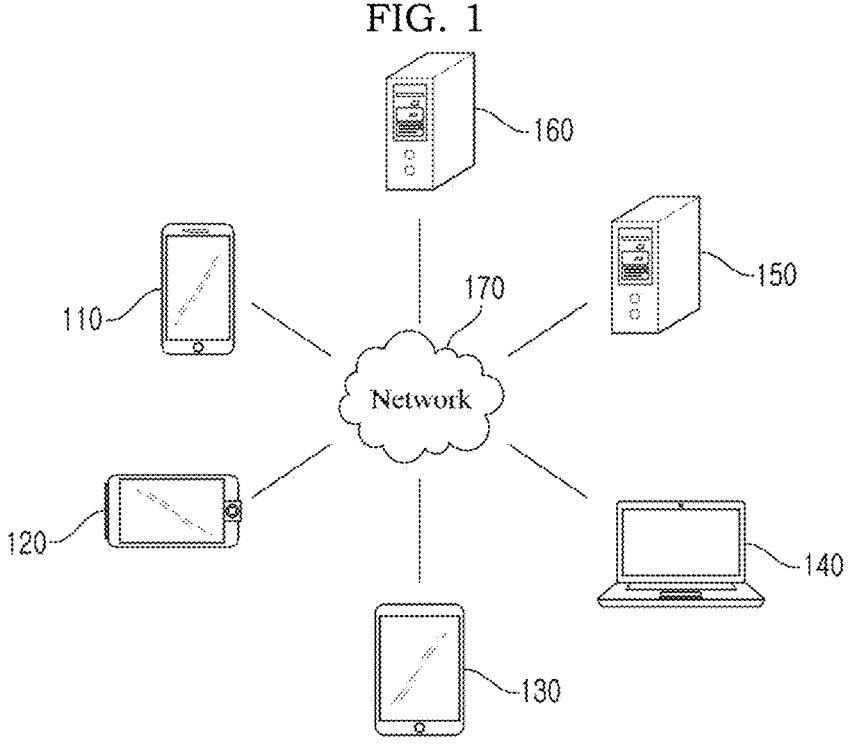
FIG. 1 is a drawing illustrating an example of a network environment according to an embodiment.

FIG. 1 is a drawing illustrating an example of a network environment according to an embodiment. The network environment of FIG. 1 indicates an example including a plurality of electronic devices 110, 120, 130, and 140, a plurality of servers 150 and 160, and a network 170. Such FIG. 1 is provided as an example only and the number of electronic devices or the servers is not limited as FIG. 1.

The plurality of electronic devices 110, 120, 130, and 140 may be stationary terminals or mobile terminals implemented with a computer system. As examples of the plurality of electronic devices 110, 120, 130, and 140, there are a smartphone, a mobile phone, a navigation device, a computer, a laptop computer, a terminal for digital broadcasting, PDA (Personal Digital Assistants), a PMP (Portable Multimedia Player), a tablet PC, a game console, a wearable device, an IoT (Internet of Things) device, a VR (virtual reality) device, an AR (Augmented reality) device, etc. As an example, in FIG. 1, a shape of a smartphone is illustrated as an example of the electronic device 110, but in the embodiments of the present disclosure, the electronic device 110 may mean one of various physical computer systems capable of communicating with other electronic devices 120, 130, and 140 and/or the servers 150 and 160 through the network 170 by substantially using wireless or wired communication method.

A communication method is not limited, and may include short-distance wireless communication between devices in addition to communication methods using communication networks (e.g., a mobile communication network, wired Internet, wireless Internet, a broadcasting network, a satellite network, and the like) which may be included in the network 170. For example, the network 170 may include one or more any networks of a PAN (personal area network), a LAN (local area network), a CAN (campus area network), a MAN (metropolitan area network), a WAN (wide area network), a BBN (broadband network), and the Internet. Furthermore, the network 170 may include any one or more of network topologies, including a bus network, a star network, a ring network, a mesh network, a star-bus network, and a tree or hierarchical network, but is not limited thereto.

Each of the servers 150 and 160 may be implemented with a computer device or a plurality of computer devices for providing instructions, code, files, contents, or services by communicating with the plurality of electronic devices 110, 120, 130, and 140 through the network 170. For example, the server 150 may be a system that provides a first service to the plurality of electronic devices 110, 120, 130, and 140 connected through the network 170, and the server 160 also may be a system that provides a second service to the plurality of electronic devices 110, 120, 130, and 140 connected through the network 170. As more particular example, through an application as a computer program installed and operated on the plurality of electronic devices 110, 120, 130, and 140, the server 150 may provide a service targeted by the corresponding application (e.g., search service and the like) as the first service to the plurality of electronic devices 110, 120, 130, and 140. As another example, the server 160 may provide a service for distributing a file for installation and operation of the above described application to the plurality of electronic devices 110, 120, 130, and 140 as the second service.

Figure 2:
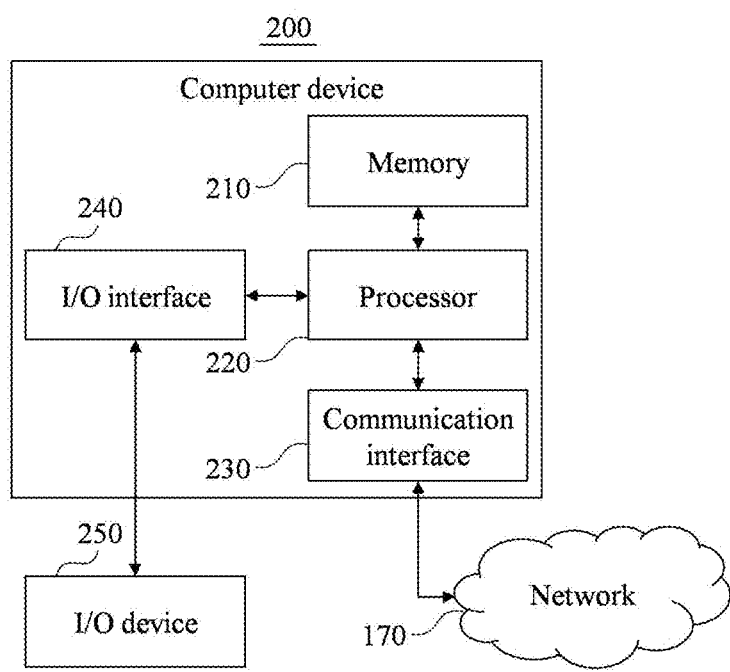
FIG. 2 is a block diagram illustrating an example of a computer device according to an embodiment.

FIG. 2 is a block diagram illustrating an example of a computer device according to an embodiment. Each of the plurality of electronic devices 110, 120, 130, and 140 or each of the servers 150 and 160 described above may be implemented by a computer device 200 shown in FIG. 2.

As illustrated in FIG. 2, such computer device 200 may include a memory 210, a processor 220, a communication interface 230, and an input/output (I/O) interface 240. The memory 210 is a computer-readable recording medium, and may include permanent mass storage devices, such as a RAM (random access memory), a ROM (read only memory) and a disk drive. Here, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable recording medium separated from the memory 210 to the memory 210. Such separate computer-readable recording medium may include computer-readable recording media, such as a floppy drive, a disk, a tape, a DVD/CD-ROM drive, a memory card, and the like. In another embodiment, software components may be loaded onto the memory 210 through the communication interface 230, not a computer-readable recording medium. For example, the software components may be loaded onto the memory 210 of the computer device 200 based on a computer program installed by files received through the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices (e.g. the above described storing devices) through the network 170. For example, a request, an instruction, data or a file generated by the processor 220 of the computer device 200 according to program code stored in a recording device such as the memory 210 may be transmitted to other devices through the network 170 according to control of the communication interface 230. Inversely, a signal, an instruction, data or a file from another device may be received to the computer device 200 through the communication interface 230 of the computer device 200 passing through the network 170. A signal, an instruction or data and the like received through the communication interface 230 may be transmitted to the processor 220 or the memory 210, and a file may be stored in a storage medium (the above described permanent storage device) which may be further included in the computer device 200.

The I/O interface 240 may be means for interface with an input/output (I/O) device 250. For example, the input device may include a device such as a microphone, a keyboard or a mouse and the like, and the output device may include a device such as a display or a speaker. For another example, the I/O interface 240 may be means for interface with a device in which functions for input and output have been integrated into one, such as a touch screen. The I/O devices 250, together with the computer device 200, may be configured as a single device.

Furthermore, in other embodiments, the computer device 200 may include components less or more than the components of FIG. 2. However, it is not necessary to clearly illustrate most of conventional components. For example, the computer device 200 may be implemented to include at least some of the I/O device 250 above described or may further include other components such as a transceiver, a database, etc.

Figure 3:
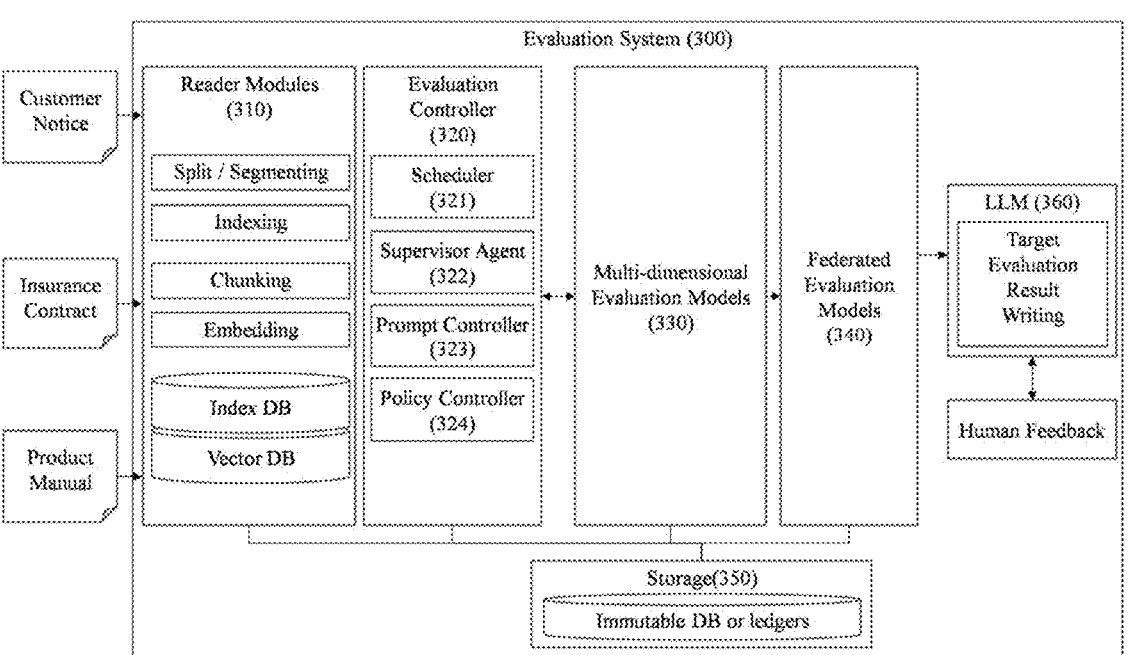
FIG. 3 is a drawing illustrating an example of an evaluation system according to an embodiment.

FIG. 3 is a drawing illustrating an example of an evaluation system according to an embodiment. An evaluation system 300 according to embodiments may be implemented through at least one computer device including at least one processor. Each computer device may correspond to the computer device 200 described through FIG. 2.

As shown in FIG. 3, the evaluation system 300 may include Reader Modules 310, an Evaluation Controller 320, Multi-dimensional Evaluation Models 330, Federated Evaluation Models 340, a Storage 350, and a LLM (Large Language Model) 360.

The Reader Modules 310 may receive evaluation target data and preprocess it by characteristics of each of a plurality of artificial intelligence models for evaluation. For example, the Reader Modules 310 may convert one evaluation target data into input for each of the plurality of artificial intelligence models for evaluation.

First, the Reader Modules 310 may read data (evaluation target data) for obtaining evaluation results based on artificial intelligence models for evaluation. Generally, documented data may be used as evaluation target data, and by adding a multi-modal interface at front end, it is possible to receive data in the form of speech or image as Speech to Text and Image to Text form.

In addition, the Reader Modules 310 may perform a role of splitting or segmenting the evaluation target data by characteristics of artificial intelligence processing (characteristics of the artificial intelligence models for evaluation).

This may be applied based on characteristics of Original data to be evaluation target and document structure.

Also, the Reader Modules 310 may index the evaluation target data. Index of data may be used for purposes such as data source and basis utilization for results of artificial intelligence models. The indexed evaluation target data may be stored in index database (Index DB) along with the index (indexing value).

Further, the Reader Modules 310 may chunk the split or segmented data. According to characteristics of data to be tested and characteristics of artificial intelligence models evaluating it, setting values for chunking may be changed, and by applying multiple chunking strategies to one Original data as needed, each chunking result is individually evaluated, and then it may be used to derive final result.

In addition, the Reader Modules 310 may generate input for each of the plurality of artificial intelligence models for evaluation by embedding the chunked data. The Reader Modules 310 may select an embedding module optimized to a specific data of various embedding models and process embedding. The selection of the embedding model is most greatly influenced by the characteristics of the artificial intelligence models for evaluation, and if there is a designated embedding model for the corresponding evaluation model, the Reader Modules 310 may select the designated embedding model and proceed with embedding. The embedded data may be stored in Vector DB (Database).

The Evaluation Controller 320 is a system or process for managing evaluation, and it may control various evaluation target data and utilization of various artificial intelligence models for evaluation for evaluation each of multiple artificial intelligence models for evaluation. Here, the various evaluation target data may mean evaluation target data preprocessed by characteristics of each of plurality of artificial intelligence models for evaluation. In other words, the Evaluation Controller 320 may control input of the preprocessed evaluation target data to the plurality of artificial intelligence models for evaluation.

Such Evaluation Controller 320 may include a Scheduler 321, a Supervisor Agent 322, a Prompt Controller 323, and a Policy Controller 324.

The Scheduler 321 may schedule overall evaluation processes of the evaluation target data by using the plurality of artificial intelligence models for evaluation. For example, the Scheduler 321 may set time required in individual process based on volume (e.g., length of token) of the evaluation target and token generation length for evaluation result.

The Supervisor Agent 322 may be an agent performing a role of continuously reading the preprocessed evaluation target data and querying each of the plurality of artificial intelligence models for evaluation so that each of the plurality of artificial intelligence models for evaluation may receive and evaluate the preprocessed evaluation target data. At this time, such query may be performed according to scheduling of the Scheduler 321. The Supervisor Agent 322 may manage the artificial intelligence models for evaluation to perform evaluation for overall evaluation contents, and designate start and end of evaluation. Information such as evaluation method may be read in as separate external information, or according to evaluation method suggested by the models for evaluation, it may perform a role of managing and proceeding querying order and procedure.

The Prompt Controller 323 may perform a role of generating prompts for evaluation to be input into each of the plurality of artificial intelligence models for evaluation. The prompt information may be provided from the artificial intelligence models for evaluation, and a specific prompt may be used by a manager. In addition, the Prompt Controller 323 may generate and utilize any prompt for query based on contents of evaluation target.

The Policy Controller 324 may perform a role of managing (storing) evaluation related policies. The Policy Controller 324 may manage contents of the evaluation target that require attention (e.g., race, region, politics, conflict elements, etc.). For example, the Prompt Controller 323 may generate prompts for evaluation based on the evaluation related policies managed by the Policy Controller 324.

The Multi-dimensional Evaluation Models 330, the Federated Evaluation Models 340, the Storage 350, and the LLM (Large Language Model) 360 will be described in more detail through FIG. 4.

Figure 4:
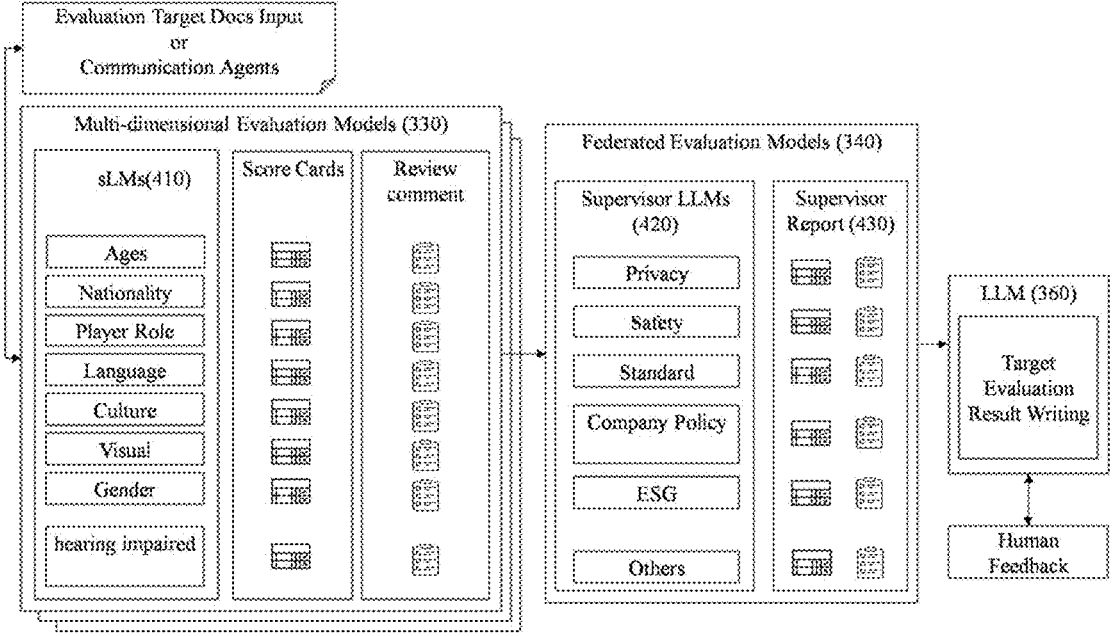
FIG. 4 is a drawing particularly illustrating Multi-dimensional Evaluation Models and Federated Evaluation Models according to an embodiment.

FIG. 4 is a drawing particularly illustrating Multi-dimensional Evaluation Models and Federated Evaluation Models according to an embodiment.

The Multi-dimensional Evaluation Models 330 may be configured to include multi-dimensional configuration for each of artificial intelligence models for evaluation according to evaluation target data and its characteristics. In other words, in case of even one artificial intelligence model for evaluation, the Multi-dimensional Evaluation Models 330 may configure and manage various instance models for one artificial intelligence model for evaluation by reflecting characteristics of the evaluation target data. For example, in case of ages, to evaluate the evaluation target across all age groups, the Multi-dimensional Evaluation Models 330 may configure one language model with a plurality of instance language models in which characteristics of difference age groups are reflected, and proceed with evaluation for each of the plurality of instance language models, and then, collect and utilize each score.

A sLMs 410 may mean a set of various language models specialized in evaluation, and the corresponding language models may be configured in multi-dimension according evaluation targets and evaluation characteristics. For example, in case that a specific evaluation target is all ages, for evaluation of the corresponding target, by using an Ages model of sLMs 410, evaluation by age groups is performed, and then, Score Cards and/or Review Comment of the corresponding evaluation may be utilized. In this case, it is possible to utilize all evaluation information for all age groups, such as the target at an elementary school reading level or above, rather than simply the language level of adults.

Similarly, in case that the corresponding evaluation target is nationalities, by using a Nationality model, evaluation may be performed according to the information characteristics of the corresponding nationalities.

In case of a Player Role model, it may be configured according to a role of the evaluation target, and in this case, evaluation may be performed according to viewpoint of various roles of the evaluation target such as a user, a manager, and the like.

In case of a Language model, evaluation may be performed for the evaluation target based on multi-language models. For example, in case of evaluating multi-language manuals for manufactured products, sMLs 410, which are configured in multi-dimension by language characteristics, may be utilized.

In case of a Culture model, evaluation may be performed by applying specific themes or genres such as music, fashion, and the like that the latest trends are reflected.

In case of a Visual model, it may be used to evaluate images. In case that images exist in the evaluation target, it may perform a function for converting information for the corresponding images into text forms and processing it as the target that other language models may evaluate. In this case, image processing process may be performed in advance.

In case of a Gender model, it may be used to evaluate whether or not contents related to gender discrimination are included. When the subject of the target is focused on a specific gender, it may be evaluated and quantified.

In case of a language model for Hearing Impaired, it may evaluate whether or not functions for script are required by determining ratio of context transfer in an area such as speech, voice, and the like for the hearing impaired. By considering the case that it is hard to transfer sufficient information through this, it is possible to separately config-ure the corresponding information into different form (e.g., from text to voice, etc.) and provide it.

Like this, the characteristics of the evaluation target data may include at least one characteristic of age groups, player role, language, culture, inclusion of visual data, gender, and hearing impaired. In this case, the Multi-dimensional Evalu-ation Models 330 may generate instance models of artificial intelligence models for evaluation for classification that the at least one characteristic has. For example, in case that the evaluation target data includes characteristic of gender, the Multi-dimensional Evaluation Models 330 may configure respectively instance models for male and instance models for female for one artificial intelligence model for evalua-tion. Classification of each characteristic may be preset for each characteristic.

In case of evaluating with scores or evaluating based on a specific condition, Score Cards are used in a form of expressing evaluation scores or satisfaction for the corre-sponding condition, and it may utilize target information specified by an evaluation requester or an evaluator as its characteristics. The scores may be configured in a score form of total scores according to setting of a manager, and the use of the scores may be on/off according to the setting. Information generated through the evaluation may be sepa-rately stored in a non-editable form.

The Review Comment is in a form that separate text-based evaluation comment information in addition to the quantified information is generated from sLMs 410, and it may be utilized as additional data for future evaluation conducted by a human manager or a Supervisor LLM 420. Whether or not to use the corresponding information may be on/off according to the setting of the manager, and the generated information may be separately stored in a non-editable form.

At this time, information may be stored in a form of Immutable database or ledgers of blockchain.

The Federated Evaluation Models 340 may integrate evaluation results for the evaluation target data of each of the plurality of artificial intelligence models for evaluation and generate overall evaluation result. For example, the Feder-ated Evaluation Models 340 may be a model for conducting additional evaluation based on results evaluated through individual language models of the sLMs 410 and generating overall evaluation result. At this time, not conducting evalu-ation for individual language models of sLMs 410, models configured in a form of Supervisor LLM 420 may conduct additional evaluation based on the individual evaluation opinion above. Therefore, evaluation is conducted on ele-ments that require overall evaluation, rather than contents that each evaluation result is important. In addition, if evaluation is conducted in multi-dimension and multiple times in the above Multi-dimensional Evaluation Models 330, the Federated Evaluation Models 340 may collect evaluation scores for individual times, and then integrate it into a federated evaluation form. The federated method uses the above described Score Cards and/or Review Comment as input values, but a method for assigning scores and the like may be utilized.

The Supervisor LLM 420 may mean LLM models for evaluation only. While the above described sLMs 410 of the Multi-dimensional Evaluation Models 330 operates primar-ily to generate data for evaluation, the models of the Supervisor LLM 420 may operate with a focus on generat-ing evaluation opinions based on the data generated by sLMs 410. In other words, the Supervisor LLM 420 may perform a role of evaluating evaluation target based on the data generated by sLMs 410 of the Multi-dimensional Evaluation Models 330.

A Supervisor Report 430 may be largely composed of Score Cards and Review Comment (or evaluation com-ment), and for each function, on/off may be selected by the manager. The Review Comment of the Supervisor Report 430 may include information related to score point assign in the evaluation results, and it may be configured to confirm that scores were assigned in which evaluation perspective. The Supervisor Report 430 may be written more richly based on the evaluation data generated by sLMs 410, and the manager may control the evaluation results based on the corresponding scores. In addition, evaluation may be addi-tionally conducted through a separate committee by using the Review Comment.

The evaluation results may be converted into a form that may be provided to human through the LLM 360, and provided, and the evaluation results may be changed later by receiving human feedback.

FIG. 5 is a flowchart illustrating an example of an evaluation process based on artificial intelligence models according to an embodiment. The embodiment of FIG. 5 may illustrate a method in which the evaluation system 300 sets an evaluation process using MOE. Each process (step) may be performed by the evaluation system 300, and the evaluation system 300 may be implemented by at least one computer device 200. At this time, the processor 220 of the at least one computer device 200 may be implemented to execute control instructions according to code of an oper-ating system or code of at least one computer program included in the memory 210. Here, the processor 220 may control the computer device 200 or the evaluation system 300 to perform the processes (steps) included in the method of FIG. 5 according to the control instructions provided by the code stored in the computer device 200.

A process of loading evaluation target information 510 may be an example of a process in which the evaluation system 300 reads the evaluation target information into the evaluation system 300. At this time, the read information may be digitalized information or information in a vision form, and it may be composed of information accessible in a form of URL (Uniform Resource Locator) according to the embodiment. The corresponding information may be con-verted into a state where it may be accessed and managed at any time on the evaluation system 300 in a form of being registered in a temporally storage (e.g., the Storage 360), and it must ensure that the evaluation target data remains unchanged.

A process of selecting artificial intelligence models for evaluation 520 is an example of a process for selecting an artificial intelligence model for evaluation (e.g., the sLMs 410 included in the Multi-dimensional Evaluation Models 330), and the evaluation system 300 may select the artificial intelligence models for evaluation based on information input by a provider of the artificial intelligence models for evaluation, or select the artificial intelligence models for evaluation in a pre-set form based on basic information and the like related to judgment (evaluation) such as evaluation categories. At this time, the evaluation system 300 must be able to describe reasons for selecting the artificial intelligence models for evaluation, and it may register related regulation information in case of regulation.

A process of analyzing format and characteristic of the evaluation target data 530 may be an example of a process in which the evaluation system 300 determines format and characteristic of data to be the evaluation target. The data to be the evaluation target may be configured in a form of simple text or rich format including tables or images according to format. In addition, the data to be the evaluation target may be configured in various forms such as office file type, PDF (Portable Document Format), web pages, text (file extension .txt or .csv) file, and the like according to data format even if it is text based document. In order for the artificial intelligence models for evaluation to accurately understand such information, characteristics, such as format and style of existing documents, must be analyzed, and it must be reflected when extracting the evaluation target data. For example, in case of data configured in a table form, the evaluation system 300 may accurately reconfigure information that each row and column mean into text, and transmit it to the artificial intelligence models for evaluation. Also, in case that text information and the like in a specific image (picture) is used, the evaluation system 300 must extract and transmit the corresponding information, and in case that objects exist in other evaluation target data, it must extract information for the corresponding objects. In addition, the evaluation system 300 may analyze format of output data and data characteristics of the artificial intelligence models for evaluation. The evaluation system 300 may determine whether multi modal interface and the like is additionally utilized according to format and characteristics of output data of the artificial intelligence models for evaluation, and it may allocate resources required for judgment according to size such as volume of output data.

A process of determining evaluation target data and artificial intelligence models for evaluation 540 may be an example of a process for determining finally artificial intelligence models for evaluation based on the previously determined artificial intelligence models for evaluation and result values of the format and characteristic analysis of the evaluation target data. According to the embodiment, the evaluation system 300 may recommend various artificial intelligence models for evaluation to an evaluation manager in order to respond to its own internal rules and related laws and regulations, in addition to information determined in advance by regulations and the like. In this case, the evaluation manager may determine use of at least one of artificial intelligence models for evaluation recommended by regulations or needs.

A process of generating evaluation target data splitting/segmenting strategies 550 may be an example of a process that the evaluation system 300 determines strategies splitting and/or segmenting evaluation the target data according to characteristics of the evaluation target data based on the characteristics of the determined artificial intelligence models for evaluation. This process may be based all of the characteristics of the artificial intelligence models for evaluation and the characteristics of the evaluation target data. In case of the artificial intelligence models for evaluation, there is a limit for length of tokens that may be input, and evaluation characteristics may be changed depending on the length. Therefore, according to characteristics of each artificial intelligence model for evaluation, there may be changes in results depending on sizes of input tokens of the evaluation target data, and accordingly, the evaluation system 300 may reconfigure and provide input data to the artificial intelligence models for evaluation by splitting and/or segmenting the evaluation target data according to characteristics presented by individual artificial intelligence model for evaluation. Also, since such splitting and/or segmenting information has a significant impact on the evaluation results, the evaluation system 300 may separately store and record the corresponding information in the Storage 360.

A process of generating evaluation target data chunking strategies 560 may be an example of a process that the evaluation system 300 determines chunking strategies tailored to configuration characteristics of the evaluation target data based on the characteristics of the previously determined artificial intelligence models for evaluation. This process may be based on all of the characteristics of the artificial intelligence models for evaluation and the characteristics of the evaluation target data. The evaluation system 300 may be separately store and record the information for the determined chunking strategies in the Storage 360.

A process of generating embedding strategies based on the artificial intelligence models for evaluation 570 may be an example of a process that the evaluation system 300 determines embedding models for embedding of the evaluation target data tailored to input characteristics of the artificial intelligence models for evaluation. Even if the evaluation target is the same, if embedding characteristics of sLMs 410 included in the Multi-dimensional Evaluation Models 330 are different, different forms of embedding models may be used. Particularly, if there are separate requirements from a regulatory agency, etc., embedding must be conducted in accordance of the corresponding situation (requirements of the regulatory agency). The evaluation system 300 may separately store and record the embedding related information in the Storage 360, and the stored information may be specified in the information for issuing certification for final evaluation.

A process of determining whether to index and setting index database/vector database 580 may include a process that the evaluation system 300 determines whether to index the evaluation target data for a separate process such as search and inquiry of the evaluation target data. For example, when performing tasks such as comparing the original text of the evaluation target based on RAG (Retrieval-Augmented Generation), the evaluation system 300 may index the evaluation target data and then store and utilize the index information in separate index database. The vector database may be a storage storing embedded vector information after the evaluation target data is embedded, and the evaluation system 300 may determine where to store such embedded vector information.

Determining splitting/segmenting strategies, chunking strategies, embedding strategies, whether to index, etc. may mean generating preprocess strategies of the evaluation target data. At this time, when a plurality of artificial intelligence models for evaluation is utilized, the evaluation system 300 may generate preprocess strategies for each of the plurality of artificial intelligence models for evaluation. Also, when a plurality of instance models for each of the plurality of artificial intelligence models for evaluation is configured, the evaluation system 300 may generate prepro-cess strategies for each of the configured plurality of instance models.

Meanwhile, the artificial intelligence models for evalua-tion must provide objective and accurate results in a specific field. For this, the artificial intelligence models for evalua-tion intensively learn knowledge of a specific domain area, and generate consistent responses to queries of the corre-sponding field. For this, it may learn regulatory information related to the corresponding domain, and if necessary, it may learn contents related to the judgment.

Such artificial intelligence models for evaluation may include a third party model which is an evaluation model provided by a reliable third party (e.g., evaluation model that reliability is provided by a government or trusted institu-tion), a mutual evaluation model which is an evaluation model used by two or more specific subjects for mutual verification, and/or a self-evaluation model which is an evaluation model used for internally providing evaluation efficiency of the evaluation system 300.

Figure 6:
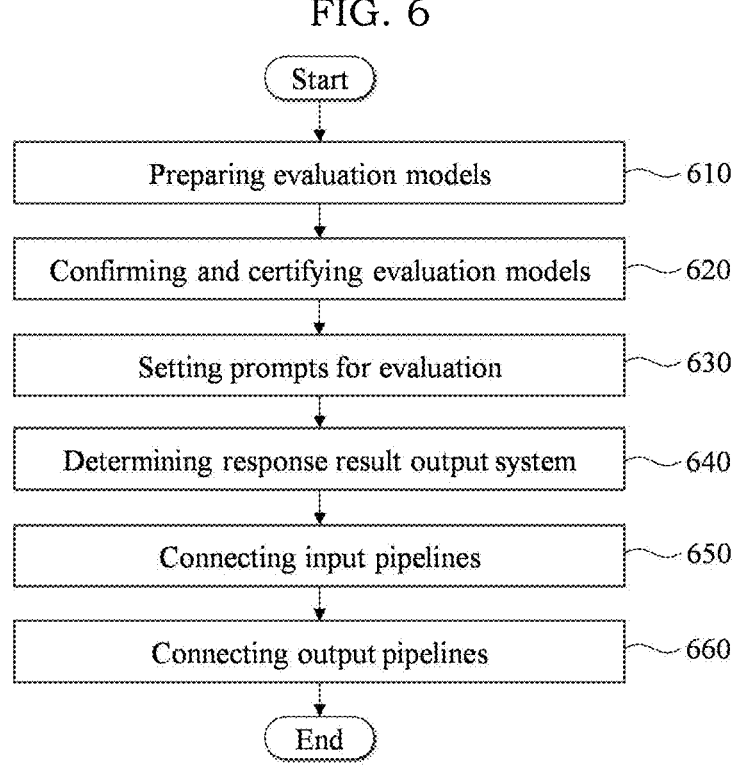
FIG. 6 is a flowchart illustrating an example of a preparing process of an evaluation model according to an embodiment.

FIG. 6 is a flowchart illustrating an example of a prepar-ing process of an evaluation model according to an embodi-ment. The embodiment of FIG. 6 may represent a method that the evaluation system 300 prepares evaluation models for an evaluation process using MOE. Each process (step) may be performed by the evaluation system 300, and the evaluation system 300 may be implemented by at least one computer device 200. At this time, the processor 220 of the at least one computer device 200 may be implemented to execute control instructions according to code of an oper-ating system or code of at least one computer program included in the memory 210. Here, the processor 220 may control the computer device 200 or the evaluation system 300 to perform the processes (steps) included in the method of FIG. 6 according to the control instructions provided by the code stored in the computer device 200.

A process of preparing artificial intelligence models for evaluation 610 may be an example of a process that the evaluation system 300 prepares artificial intelligence models for evaluation (e.g., sLM, LLM, MOE, etc.) specialized in a specific domain to be utilized in evaluation. For example, the evaluation system 300 may register artificial intelligence models for evaluation to be utilized according to evaluation characteristics. As previously described, the artificial intel-ligence models for evaluation may use a third party model authorized by an external institution, a mutual evaluation model used by two or more specific subjects for mutual verification, and/or a self-evaluation model used for inter-nally providing evaluation efficiency of the evaluation sys-tem 300. In case of using the self-evaluation model, to receive external authentication of normal evaluation func-tions of the corresponding model, safety of the model may be evaluated with a form that the corresponding functions are continuously accessible to authorized users. For each of the artificial intelligence models for evaluation, its opera-tional requirements and characteristics according to the operation (maximum input token size, minimum memory usage, CPU occupation ratio, etc.) may be pre-defined, and the corresponding information may be provided with each of the artificial intelligence models for evaluation. When the artificial intelligence models for evaluation operate based on the corresponding information, the evaluation system 300 may proceed with orchestration tasks for system perfor-mance.

A process of confirming and certifying the evaluation model 620 may be an example of a process that the evalu-ation system 300 confirms uniqueness and parameter information for the artificial intelligence models for evaluation. The artificial intelligence models for evaluation, such as sLM, LLM, etc. have large scale hyper parameters, and have characteristics that they may operate in a form different from intention when some values of them are changed. Therefore, the evaluation system 300 may generate and store data that may certificate the artificial intelligence models for evalu-ation to be utilized, such as hash values for the correspond-ing parameter information, and it may be used to confirm and verify the characteristics of the corresponding artificial intelligence models for evaluation in the future.

A process of setting prompts for evaluation 630 may be an example of a process that the evaluation system 300 sets prompts to be input to the artificial intelligence models for evaluation. The artificial intelligence models for evaluation must proceed with evaluation only for contents given for evaluation of the evaluation target data, and it may output results of the evaluation process as preset. Accordingly, the evaluation system 300 may proceed with setting prompts according to evaluation characteristics of each of the artifi-cial intelligence models for evaluation. At this time, as information for prompt setting, for each specific domain, information going through separate expert evaluation, information mutually agreed, and/or information specified by law or regulation may be utilized. In other words, the evaluation system 300 may set prompts by reflecting infor-mation going through separate expert evaluation, informa-tion mutually agreed, and/or information specified by law or regulation. As another example, the evaluation system 300 may proceed with prompt setting by reflecting information for company rules or for separate evaluation procedures. At this time, in case of a specific area (domain), the evaluation system 300 may secure and evaluate response results for a specific question by regulating evaluation prompts or setting a specific evaluation prompt in advance.

A process of determining response result output system 640 may be an example of a process that the evaluation system 300 determines output system of result response (results, output) values according to tests of the artificial intelligence models for evaluation. For example, when Score Cards and/or Review Comment are requested, the artificial intelligence models for evaluation must configure responses for the corresponding output. For example, the correspond-ing artificial intelligence models for evaluation must receive questions, and output response scores and review comment, respectively. For this, appropriate evaluation output results may exist for each of the artificial intelligence models for evaluation. For this, the evaluation system 300 may proceed with prompt setting for output results, and such prompt setting may be based on pre-agreed rules.

A process of connecting input pipelines 650 may be an example of a process that the evaluation system 300 con-nects input pipelines for the artificial intelligence models for evaluation. At this time, the evaluation system 300 may connect input pipelines limiting input speed of the evalua-tion target data and token length to the artificial intelligence models for evaluation based on operation characteristics and/or performance of operation environment for each of the artificial intelligence models for evaluation.

A process of connecting output pipelines 660 may be an example of a process that the evaluation system 300 con-nects output pipelines for process of result values output by the artificial intelligence models for evaluation to the arti-ficial intelligence models for evaluation. For example, the result values may be reused again as input of the artificial intelligence models for evaluation as needed, or used as evaluation index as input of next step (e.g., other artificial intelligence models for evaluation), or separately used on the evaluation system 300. For various use of such result values, the evaluation system 300 may connect output pipelines for process of results value of the artificial intelligence models for evaluation (e.g., API (Application Programming Interface) to the artificial intelligence models for evaluation. For this, a manager or the evaluation system 300 may configure pipelines for connecting response output system for each of the artificial intelligence models for evaluation. The result values of the artificial intelligence models for evaluation may be stored or managed in external space reliable by a third party.

FIG. 7 is a flowchart illustrating an example of an evaluation method of an evaluation system according to an embodiment. Steps 710 to 750 included in an evaluation method of FIG. 7 may be implemented by at least one computer device 200 above described. The evaluation system 300 may be implemented by at least one computer device 200. At this time, the processor 220 of the at least one computer device 200 may be implemented to execute control instructions according to code of an operating system or code of at least one computer program included in the memory 210. Here, the processor 220 may control the computer device 200 to perform Steps 710 to 750 included in the method of FIG. 7 according to the control instructions provided by the code stored in the computer device 200.

In Step 710, the evaluation system 300 may receive evaluation target data through the Reader Modules 310, and preprocess it according to characteristics of each of the plurality of artificial intelligence models for evaluation. For example, the evaluation system 300 may split or segment the evaluation target data according to the characteristics of each of the plurality of artificial intelligence models for evaluation in Step 710. Then, the evaluation system 300 may chunk the split or segmented evaluation target data, and generate input for each of the plurality of artificial intelligence models for evaluation by embedding the chunked evaluation target data. According to the embodiment, the evaluation system 300 may index the evaluation target data, and store the indexed evaluation target data with index in index database in Step 710.

In Step 720, the evaluation system 300 may configure each of the plurality of artificial intelligence models for evaluation into a plurality of instance models in multi-dimension through the Multi-dimensional Evaluation Models 330 according to characteristics of the evaluation target data. Here, the characteristics of the evaluation target data may include at least one characteristic of ages, nationality, player role, language, culture, inclusion of visual data, gender, and hearing impairment. In this case, the evaluation system 300 may generate instance models of the artificial intelligence models for evaluation by each predetermined classification for each of the at least one characteristic through the Multi-dimensional Evaluation Models 330.

In Step 730, the evaluation system 300 may control input of the evaluation target data preprocessed through the Evaluation Controller 320 into the plurality of artificial intelligence models for evaluation. For example, the evaluation system 300 may schedule overall evaluation processes of the evaluation target data by using the plurality of artificial intelligence models for evaluation through the Scheduler 321 included in the Evaluation Controller 320. Also, the evaluation system 300 may generate prompts for evaluation to be input into each of the plurality of artificial intelligence models for evaluation through the Prompt Controller 323 further included in the Evaluation Controller 320. Then, the evaluation system 300 may continuously read the preprocessed evaluation target data and query each of the plurality of artificial intelligence models for evaluation so that each of the plurality of artificial intelligence models for evaluation may evaluate the preprocessed evaluation target data through the Supervisor Agent 322 further included in the Evaluation Controller 320. According to the embodiment, the evaluation system 300 may store evaluation related policies through the Policy Controller 324 further included in the Evaluation Controller 320. In this case, the evaluation system 300 may generate the prompts for evaluation based on the evaluation related policies through the Prompt Controller 323.

According to the embodiment, each of the plurality of instance models may be implemented to be able to output scores or review comments as results of evaluation for the preprocesses evaluation target data. It was previously described that on/off of Score Cards and/or Review Comment may be set by the manager.

In Step 740, the evaluation system 300 may integrate evaluation results for the preprocessed evaluation target data of each of the plurality of artificial intelligence models for evaluation and generate overall evaluation result through the Federated Evaluation Models 340. For example, the Federated Evaluation Models 340 may receive the evaluation results from each of the plurality of artificial intelligence models for evaluation as input, conduct additional evaluation, and generate the overall evaluation results. According to the embodiment, the overall evaluation results may be configured to include scores of additional evaluation or review comments for additional evaluation. In this case too, on/off of Score Cards (scores) and/or Review Comment may be set by the manager.

In Step 750, the evaluation system 300 may convert the overall evaluation result into a form that may be provided to human through a language model (e.g., LLM 360). The converted overall evaluation result may be provided to human (a user, a manager), and the evaluation system 300 may receive feedback of human and regenerate overall evaluation result. Like this, according to the embodiments of the present disclosure, a method and system for evaluating evaluation target by various characteristics using MOE may be provided. Also, a method and system for setting evaluation process using MOE may be provided. In addition, a method and system for preparing evaluation models for evaluation process using MOE may be provided.

The aforementioned system and device may be implemented as a hardware component, a software component, and/or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, virtual equipment, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server. Examples of program instructions include both machine code, such as produced by a compiler, and higher level code that may be executed by the computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

What is claimed is:

1. An evaluation system, comprising:
at least one processor configured to execute computer-readable instructions included in a memory,
wherein the at least one processor is configured to
receive evaluation target data and preprocessing it by characteristics of each of a plurality of artificial intelligence models for evaluation;
control input of the preprocessed evaluation target data into the plurality of artificial intelligence models for evaluation;

configure each of the plurality of artificial intelligence models for evaluation into a plurality of instance models in multi-dimension by characteristics of the evaluation target data, each of the plurality of instance models corresponding to a specific classification within at least one of the characteristics of the evaluation target data; and
integrate evaluation results for the preprocessed evaluation target data of each of the plurality of artificial intelligence models for evaluation and generating an overall evaluation result,
wherein the at least one processor is configured to control the input by providing the same preprocessed evaluation target data as a common input to each of the plurality of instance models such that each of the instance models evaluates the common input from a different perspective associated with its corresponding specific classification,
wherein the characteristics of the evaluation target data comprise at least two of age, nationality, player role, language, culture, inclusion of visual data, gender, and hearing impairment,
wherein the processor is configured to generate the plurality of the instance models by generating at least two instance models for each of the artificial intelligence models for evaluation in association with each of the least two characteristics based on classification criterion predetermined for each of the least two characteristics,
wherein each of the plurality of instance models outputs scores or review comments as an evaluation result for the preprocessed evaluation target data, and the evaluation result is stored in a form of ledgers of blockchain,
wherein the processor is configured to
generate prompts for evaluation to be input into each of the plurality of instance models based on evaluation-related policies that manage sensitive content including at least one of race, region, or politics,
conduct additional evaluation for the evaluation target data using a large language model (LLM) based on the evaluation result of each of the plurality of instance models, input to the LLM, and
generate the overall evaluation result based on the additional evaluation,
wherein the LLM functions as a supervisor model that receives the scores and the review comments from each of the plurality of instance models as a plurality of evaluation opinions, and conducts the additional evaluation by generating a supervisory evaluation opinion based on said plurality of evaluation opinions, and
wherein the overall evaluation result comprises scores for the additional evaluation and review comments for the additional evaluation.

2. The evaluation system of claim 1, wherein the processor is configured to
split or segment the evaluation target data by characteristics of each of the plurality of artificial intelligence models for evaluation;
chunk the split or segmented evaluation target data; and
generate input for each of the plurality of artificial intelligence models for evaluation by embedding the chunked evaluation target data.

3. The evaluation system of claim 1, wherein the processor is configured to
index the evaluation target data and store the indexed evaluation target data with index in index database.

4. The evaluation system of claim 1, wherein the processor is configured to:

schedule overall evaluation processes of the evaluation target data by using the plurality of artificial intelligence models for evaluation;

continuously read the preprocessed evaluation target data and querying each of the plurality of artificial intelligence models for evaluation so that each of the plurality of artificial intelligence models for evaluation may evaluate the preprocessed evaluation target data.

5. An evaluation process setting method of a computer device comprising at least one processor, comprising:

selecting artificial intelligence models for evaluation registered in an evaluation system for evaluation of evaluation target data, by the at least one processor;

analyzing format and characteristics of the evaluation target data, by the at least one processor, the characteristics of the evaluation target data including at least two of age, nationality, player role, language, culture, inclusion of visual data, gender, and hearing impairment;

determining artificial intelligence models for evaluation to be used in evaluation of the evaluation target data based on the selected artificial intelligence models for evaluation and the analyzed format and characteristics of the evaluation target data, by the at least one processor; and generating preprocess strategies of the evaluation target data based on characteristics of the determined artificial intelligence models for evaluation and the characteristics of the evaluation target data, by the at least one processor, wherein the evaluation system configures each of the determined artificial intelligence models for evaluation into a plurality of instance models in multi-dimension by the characteristics of the evaluation target data, each of the plurality of instance models corresponding to a specific classification within at least one of the characteristics of the evaluation target data, and the generating preprocess strategies generates preprocess strategies for each of the plurality of instance models, wherein the evaluation system is configured to generate the plurality of the instance models by generating at least two instance models for each of the processor artificial intelligence models for evaluation in association with each of the least two characteristics based on classification criterion predetermined for said each of the least two characteristics, wherein each of the plurality of instance models outputs scores or review comments as evaluation result for the preprocessed evaluation target data, and the evaluation result is stored in a form of ledgers of blockchain, wherein the evaluation system is configured to generate prompts for evaluation to be input into each of the plurality of instance models based on evaluation-related policies that manage sensitive content including at least one of race, region, or politics, conduct additional evaluation for the evaluation target data using a large language model (LLM) based on the evaluation result of each of the plurality of instance models, input to the LLM, and generate an overall evaluation result based on the additional evaluation, and wherein the evaluation system is configured to control the input by providing the same preprocessed evaluation target data as a common input to each of the plurality of instance models such that each of the instance models evaluates the common input from a different perspective associated with its corresponding specific classification, wherein the LLM functions as a supervisor model that receives the scores and the review comments from each of the plurality of instance models as a plurality of evaluation opinions, and conducts the additional evaluation by generating a supervisory evaluation opinion based on said plurality of evaluation opinions, and wherein the overall evaluation result comprises scores for the additional evaluation and review comments for the additional evaluation.

6. The evaluation process setting method of claim 5, wherein the generating preprocess strategies comprises:

determining splitting strategies or segmenting strategies for splitting or segmenting the evaluation target data by characteristics of each of the plurality of artificial intelligence models for evaluation;

determining chunking strategies for chunking the split or segmented evaluation target data; and determining embedding strategies for generating input for each of the plurality of artificial intelligence models for evaluation by embedding the chunked evaluation target data, and wherein the determining splitting strategies or segmenting strategies determines the splitting strategies or segmenting strategies based on length of tokens that may be input into the artificial intelligence models for evaluation, and the determining embedding strategies determines embedding strategies for using different forms of embedding models by embedding characteristics of the artificial intelligence models for evaluation for the same evaluation target data.

7. The evaluation process setting method of claim 5, wherein the generating preprocess strategies comprises determining whether to index the evaluation target data.

8. The evaluation process setting method of claim 5, wherein the determining artificial intelligence models for evaluation to be used determines a plurality of artificial intelligence models for evaluation for evaluating each of the evaluation target data, and the generating preprocess strategies generates preprocess strategies for each of the plurality of artificial intelligence models for evaluation.

9. The evaluation process setting method of claim 5, wherein the analyzing determines the format of the evaluation target data as at least one of text format, or rich format including tables or images.

10. The evaluation process setting method of claim 5, further comprising analyzing format and characteristics of output data of the determined artificial intelligence models for evaluation, by the at least one processor.

11. A method for preparing evaluation models of a computer device comprising at least one processor, comprising:

registering artificial intelligence models for evaluation to be used by characteristics of evaluation target data in an evaluation system, by the at least one processor;

confirming at least one of uniqueness and parameter information of the artificial intelligence models for evaluation, by the at least one processor;

setting prompts for evaluation to be input into the artificial intelligence models for evaluation, by the at least one processor;

determining an output system of output values of the artificial intelligence models for evaluation, by the at least one processor;

connecting input pipelines for input of the artificial intelligence models for evaluation, by the at least one processor;

connecting output pipelines for process of output values of the artificial intelligence models for evaluation, by the at least one processor, wherein the evaluation system is configured to receive evaluation target data and preprocessing it by characteristics of each of a plurality of artificial intelligence models for evaluation;

control input of the preprocessed evaluation target data into the plurality of artificial intelligence models for evaluation;

configure each of the plurality of artificial intelligence models for evaluation into a plurality of instance models in multi-dimension by characteristics of the evaluation target data, each of the plurality of instance models corresponding to a specific classification within at least one of the characteristics of the evaluation target data; and integrate evaluation results for the preprocessed evaluation target data of each of the plurality of artificial intelligence models for evaluation and generating an overall evaluation result, wherein the evaluation system is configured to control the input by providing the same preprocessed evaluation target data as a common input to each of the plurality of instance models such that each of the instance models evaluates the common input from a different perspective associated with its corresponding specific classification, wherein the characteristics of the evaluation target data comprise at least two of age, nationality, player role, language, culture, inclusion of visual data, gender, and hearing impairment, wherein the evaluation system is configured to generate the plurality of the instance models by generating at least two instance models for each of the artificial intelligence models for evaluation in association with each of the least two characteristics based on classification criterion predetermined for each of the least two characteristics, wherein each of the plurality of instance models outputs scores or review comments as an evaluation result for the preprocessed evaluation target data, and the evaluation result is stored in a form of ledgers of blockchain, wherein the evaluation system is configured to generate the prompts for evaluation to be input into each of the plurality of instance models based on evaluation-related policies that manage sensitive content including at least one of race, region, or politics, conduct additional evaluation for the evaluation target data using a large language model (LLM) based on the evaluation result of each of the plurality of instance models, input to the LLM, and generate the overall evaluation result based on the additional evaluation, wherein the LLM functions as a supervisor model that receives the scores and the review comments from each of the plurality of instance models as a plurality of evaluation opinions, and conducts the additional evaluation by generating a supervisory evaluation opinion based on said plurality of evaluation opinions, and wherein the overall evaluation result comprises scores for the additional evaluation and review comments for the additional evaluation.

12. The method for preparing evaluation models of claim 11, wherein the artificial intelligence models for evaluation comprise at least one of an evaluation model provided by a third party, an evaluation model used by two or more specific subjects for mutual verification, and an evaluation model internally used by the evaluation system.

13. The method for preparing evaluation models of claim 11, wherein the confirming comprises generating and storing data for certification of the artificial intelligence models for evaluation, and data for the certification of the artificial intelligence models for evaluation comprises hash values for the parameter information.

14. The method for preparing evaluation models of claim 11, wherein the setting prompts for evaluation sets the prompts for evaluation based on at least one of information going through a separate evaluation procedure for each specific domain, information specified by law or regulation, company rules, preset regulation for the prompts for evaluation, and the preset prompt.

15. The method for preparing evaluation models of claim 11, wherein the connecting input pipelines connects input pipelines limiting at least one of input speed of the evaluation target data and length of tokens based on at least one of operation characteristics of the artificial intelligence models for evaluation and performance of operation environment to the artificial intelligence models for evaluation, and the connecting output pipelines connects the output pipelines to the artificial intelligence models for evaluation according to at least one of whether the output values of the artificial intelligence models for evaluation are reused again as input of the artificial intelligence models for evaluation, whether the output values are used as evaluation index as input of other artificial intelligence models for evaluation, and whether the output values are separately used in the evaluation system.

* * * * *